(12) United States Patent
Kropaczek et al.

(10) Patent No.: US 7,574,337 B2
(45) Date of Patent: Aug. 11, 2009

(54) METHOD OF DETERMINING A FRESH FUEL BUNDLE DESIGN FOR A CORE OF A NUCLEAR REACTOR

(75) Inventors: David Joseph Kropaczek, Wilmington, NC (US); Mehdi Asgari, Wilmington, NC (US); Matthew Anderson Jessee, Raleigh, NC (US)

(73) Assignee: Global Nuclear Fuel - Americas, LLC, Wilmington, DE (US)

( * ) Notice: Subject to any disclaimer, the term of this patent is extended or adjusted under 35 U.S.C. 154(b) by 151 days.

(21) Appl. No.: 11/024,973

(22) Filed: Dec. 30, 2004

(65) Prior Publication Data
US 2006/0149514 A1 Jul. 6, 2006

(51) Int. Cl.
*G06F 17/50* (2006.01)
*G06F 7/48* (2006.01)
*G05B 13/02* (2006.01)
*G21C 17/00* (2006.01)
*G21C 19/00* (2006.01)
*G09B 19/00* (2006.01)
*G09B 25/00* (2006.01)

(52) U.S. Cl. .......................... 703/6; 434/218; 434/365; 703/1; 376/245; 376/256; 376/259; 376/267

(58) Field of Classification Search .................. 703/6, 703/1; 700/28; 434/218, 365; 376/245, 376/256, 259, 267
See application file for complete search history.

(56) References Cited

U.S. PATENT DOCUMENTS

| | | | | |
|---|---|---|---|---|
| 5,790,618 | A * | 8/1998 | Fawks, Jr. | 376/259 |
| 5,923,717 | A * | 7/1999 | Fawks, Jr. | 376/245 |
| 6,748,348 | B1 * | 6/2004 | Russell, II | 703/6 |
| 2003/0086520 | A1 * | 5/2003 | Russell et al. | 376/259 |
| 2004/0101083 | A1 * | 5/2004 | Russell et al. | 376/256 |
| 2004/0122629 | A1 * | 6/2004 | Russell et al. | 703/2 |
| 2004/0122632 | A1 * | 6/2004 | Kropaczek et al. | 703/2 |
| 2004/0191734 | A1 * | 9/2004 | Russell et al. | 434/218 |
| 2004/0220787 | A1 * | 11/2004 | Russell et al. | 703/6 |
| 2005/0015227 | A1 * | 1/2005 | Kropaczek et al. | 703/6 |

OTHER PUBLICATIONS

Liu et al. "SCYCLE—Advanced Loading Pattern Optimization Code Using New Algorithm" 2002.*
Faria et al. "Nuclear Fuel Loading Pattern Optimisation Using a Neural Network" Annals of Nuclear Energy 30 (2003) 603-613.*

* cited by examiner

*Primary Examiner*—Hugh Jones
*Assistant Examiner*—Shambhavi Patel
(74) *Attorney, Agent, or Firm*—Harness, Dickey & Pierce

(57) ABSTRACT

A method for determining a fresh fuel bundle design for a core of a nuclear reactor may include defining a plurality of inputs including user-defined target conditions for evaluating one or more reference fresh fuel bundle designs for each of N bundle groups, and generating a response surface based on making single rod-type changes in each (i,j) rod location of each bundle of a given reference bundle design being evaluated for each of the N bundle groups. A search algorithm may be iterated to evaluate a given combination of multiple rod-type changes made simultaneously across each of the N bundle groups using the generated response surface to determine an accepted fuel bundle design for each of the N bundle groups that satisfies the user-defined target conditions.

13 Claims, 6 Drawing Sheets

Perturbation in Corner Rod Enrichment
(+0.2 wt% U235)

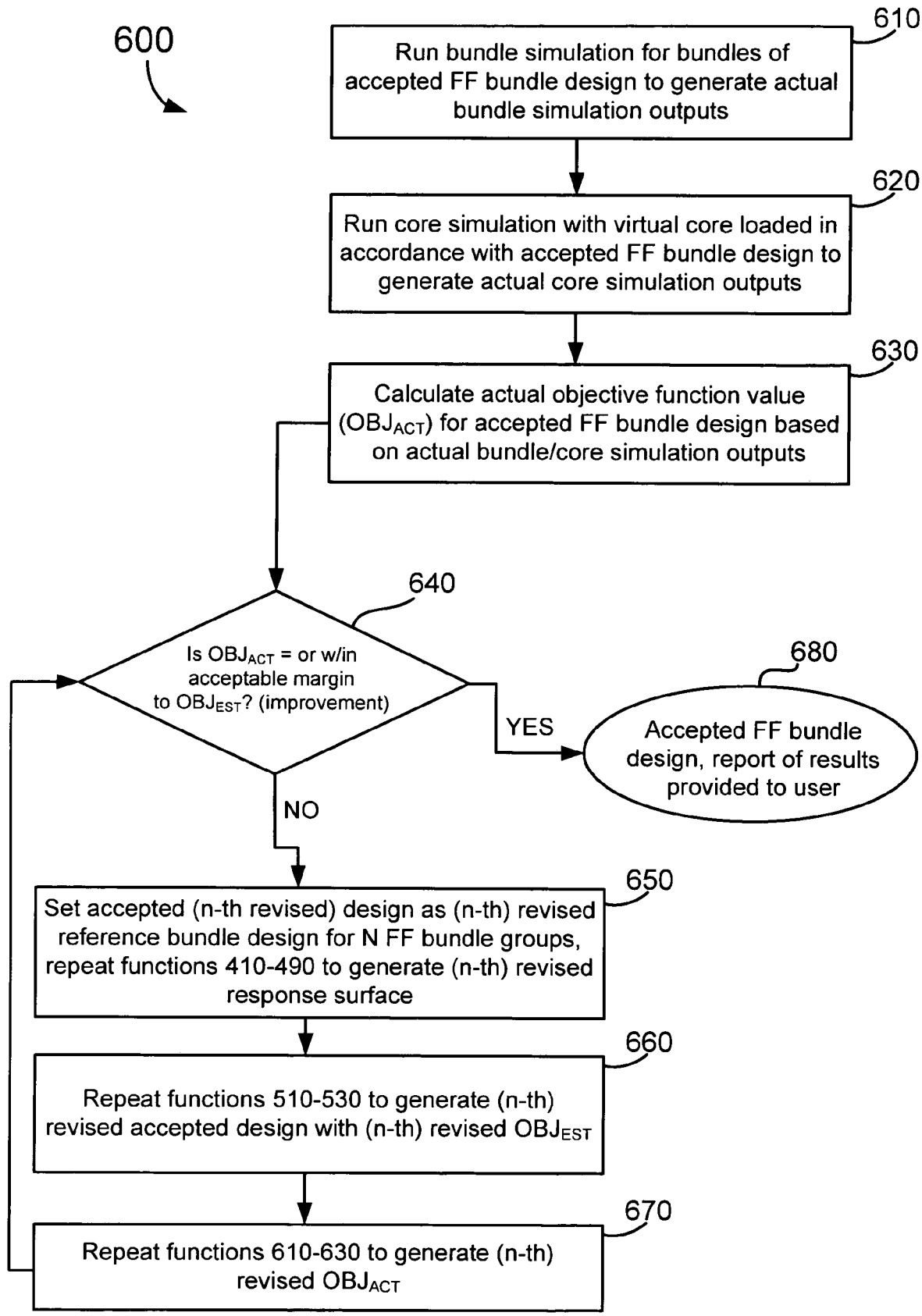

METHOD OF DETERMINING A FRESH FUEL BUNDLE DESIGN FOR A CORE OF A NUCLEAR REACTOR

CROSS-REFERENCE TO RELATED APPLICATIONS

This application is related to co-pending U.S. patent application Ser. No. 10/879,358 by David J. KROPACZEK et al. and entitled METHOD, ARRANGEMENT AND COMPUTER PROGRAM FOR DETERMINING STANDARDIZED ROD TYPES FOR NUCLEAR REACTORS. This application is also related to co-pending U.S. patent application Ser. No. 10/645,632 by Catherine A. DAUBERT et al. and entitled METHOD AND ARRANGEMENT TO DETERMINE FUEL BUNDLE CONFIGURATION FOR CORE OF A NUCLEAR REACTOR. The entire contents of each of the above-noted co-pending applications are incorporated by reference herein.

BACKGROUND OF THE INVENTION

1. Field of the Invention

The present invention relates generally to nuclear reactors, and more particularly to determining a fresh fuel bundle design for a core of a nuclear reactor.

2. Description of the Related Art

A boiling water reactor (BWR) or pressurized water reactor (PWR) typically operates from one to two years before requiring fuel replacement. This period is referred to as a fuel cycle or energy cycle. Upon completion of a cycle, approximately ¼ to ½ (typically about ⅓) of the least reactive fuel in the reactor core is discharged to a spent fuel pool. The number of fuel assemblies (e.g., fuel bundles) discharged typically are replaced by an equal number of fresh fuel bundles ("fresh bundles").

The fresh bundles may vary in bundle average enrichment (the average % of enriched uranium (U235) and poisons (such as gadolinium) across the fresh fuel bundle, determined by the total weight of U235 and gadolinium in the bundle divided by the weight of the bundle). The fresh bundles may also vary in their local peaking characteristics, exposure peaking, R-factor characteristics, and overall exposure dependent reactivity, each of which may represent local bundle limits.

The exposure dependent local peaking factor of a fresh bundle may be determined from the maximum local peaking value in any one fuel rod of the fresh bundle in question. The higher the local peaking factor, the higher the Maximum Fraction of Limiting Power Density (MFLPD) and Maximum Average Planar Linear Heat Generation Rate (MAPLHGR), which are power-related limits on nuclear fuel for the core, or global core limits. The R-factor for each rod of a bundle is defined with respect to the correlation employed for bundle Critical Power Ratio (CPR), a power-related fuel limit for the core, and is calculated for each rod as a weighted average of the axially integrated rod powers in the vicinity of the given rod. In other environments, alternate correlations for CPR may exist that reference R-factor by another term that is similarly based on a weighted average of rod powers within the bundle. The R-Factor for a fresh bundle may be determined from the maximum R-Factor in any rod of the fresh bundle in question. Likewise, the higher the R-factor, the higher the Maximum Fraction of Limiting Critical Power Ratio (MFLCPR), which is also a power-related fuel limit for the core. MFLCPR measures the allowable margin between operating conditions and a limit to 'dryout', explained in further detail below.

When coolant in a core can no longer remove heat at a sufficient rate, the fuel and clad temperature will start to increase rapidly. This boiling transition condition may be known as film dryout, burnout, departure from nucleate boiling, etc., depending on the actual conditions leading to the temperature excursion. For BWR fuel, the boiling transition phenomenon may be referred to as dryout. An R-factor value may be a value correlating thermal hydraulic variables (such as flow rate, inlet subcooling, system pressure, hydraulic diameter) to the axially integrated fuel rod power distribution within the bundle. Exposure peaking is related to the integral of the local peaking of each individual fuel rod and is constrained by the maximum licensed exposure capability of the fuel.

Because local peaking and R-factor values in any fuel bundle are directly proportional to core thermal limits such as MAPLHGR limits (KW/ft limits) and MFLCPR limits, it is beneficial to effectively determine local peaking and R-factor values at each exposure. Determining accurate local peaking and R-factor values at each exposure during a core or fuel bundle design phase may aid efforts to design fresh fuel bundles that meet core performance criteria for a specified reactor plant, so as not to violate any of the core thermal limits, while still meeting other criteria such as bundle average enrichment, hot-to-cold swing (reactivity excursion at beginning of cycle (BOC) from hot, uncontrolled conditions to cold, controlled conditions), and overall exposure dependent reactivity. Exposure peaking should also be considered in determining a fresh fuel bundle design or configuration for a core, as a high exposure peaking factor limits the maximum bundle exposure and therefore the maximum reload enrichment that can be loaded in the reactor.

Fresh bundle design is currently an iterative process. The designer uses information from the cycle energy requirements, operating limits, and thermal limits of a given core being modeled to create a bundle design with a target average enrichment, number of gadolinium rods, and average gadolinium concentration. The fresh bundle design is then modeled using various computer codes (lattice physics, cross-section fitting, R-factor calculation, etc.) known as bundle design codes, as part of a bundle simulation. The fresh bundle design is then inserted into a core simulator, which is a software program that simulates reactor operation with a 'virtual core' configured with the fresh bundle design. The designer analyzes the results of the core simulation to modify the fresh bundle design. The modified fresh bundle design is then analyzed in the bundle design codes again (bundle simulation) and reactor operations for a virtual core loaded in accordance with the modified bundle design is simulated in the core simulator (core simulation) for verification. The designer may iteratively repeat these steps until the design requirements are satisfied, such as all target thermal limits met, target power satisfied, etc.

This iterative approach to fresh bundle design is a time-consuming, inefficient process. The input files and execution files for all the various computer codes have to be created and run in the correct order. An interactive-GUI program (IBNDL) may be used to automate most of these tasks, but still requires significant user intervention at various stages in the process. After the bundle calculations, the fresh bundle design is added to the core simulator input manually or by using another interactive-GUI program. There is thus no automation and consolidation of the various computer codes onto one platform. In addition, this iterative approach can lead to bundle designs consisting of complicated rod designs and configurations that can increase manufacturing time.

SUMMARY OF THE INVENTION

An exemplary embodiment of the present invention is directed to a method of determining a fresh fuel bundle design for a core of a nuclear reactor. The method may include defining a plurality of inputs including user-defined target conditions for evaluating one or more reference fresh fuel bundle designs for each of N bundle groups, and generating a response surface based on making single rod-type changes in each (i,j) rod location of each bundle of a given reference bundle design being evaluated for each of the N bundle groups. A search algorithm may be iterated to evaluate a given combination of multiple rod-type changes made simultaneously across each of the N bundle groups using the generated response surface to determine an accepted fuel bundle design for each of the N bundle groups that satisfies the user-defined target conditions.

Another exemplary embodiment of the present invention is directed to a method of determining a fresh fuel bundle design for a core of a nuclear reactor using optimization, in which at least one optimization routine is employed to achieve a desired fuel bundle design meeting user-defined target conditions for up to N fresh fuel bundle groups of a given core being evaluated. The optimization routine may be configured to generate a response surface based on making single rod-type changes in each (i,j) rod location of each bundle of a given reference bundle design being evaluated for each of the N bundle groups. The optimization routine may autonomously evaluate a plurality of candidate fresh fuel bundle design solutions, each candidate design solutions generated by making multiple rod-type changes simultaneously across each of the N bundle groups using the generated response surface. Each candidate design solution is evaluated with an objective function to converge to a desired fuel bundle design for each of the N bundle groups that satisfies the user-defined target conditions.

BRIEF DESCRIPTION OF THE DRAWINGS

Exemplary embodiments of the present invention will become more fully understood from the detailed description given herein below and the accompanying drawings, wherein like elements are represented like reference numerals which are given by way of illustration only and thus are not limitative of the exemplary embodiments of the present invention.

FIG. 6 is a flow diagram illustrating the verification subroutine for the accepted fresh fuel bundle design in more detail, in accordance with an exemplary embodiment of the invention.

DETAILED DESCRIPTION OF THE EXEMPLARY EMBODIMENTS

As used herein, a response surface hereafter may occasionally be referred to as a response surface model. Further, a "fuel bundle design" as described herein may be understood as a design for one or more fresh fuel bundles to be manufactured for insertion into an existing core of a nuclear reactor plant at a planned outage, for example, The design may be for one or more (N) groups of fresh fuel bundles and may include the locations of the groups and locations of the fresh fuel bundles in each group, or any number of fresh fuel bundles or groups of fresh fuel bundles of an initial core design for a specified nuclear reactor plant.

The method and arrangement for determining a fresh fuel bundle design for a core of a nuclear reactor may employ a graphical user interface (GUI) and a processing medium (e.g., software-driven program, processor, application server, etc.). The GUI and processing medium, in conjunction with one or more calculation servers, databases and/or memories, may enable a user or designer to graphically direct an expedited process of evaluating one or more existing reference fuel bundle designs for up to N bundle groups of a given core by making fuel rod-by-fuel rod changes in given (i, j) rod locations of the fresh fuel bundles in the one or more reference fresh fuel bundle designs for each bundle group, so as to develop a fresh fuel bundle design that meets certain target conditions or requirements the user's core.

Figure 1:
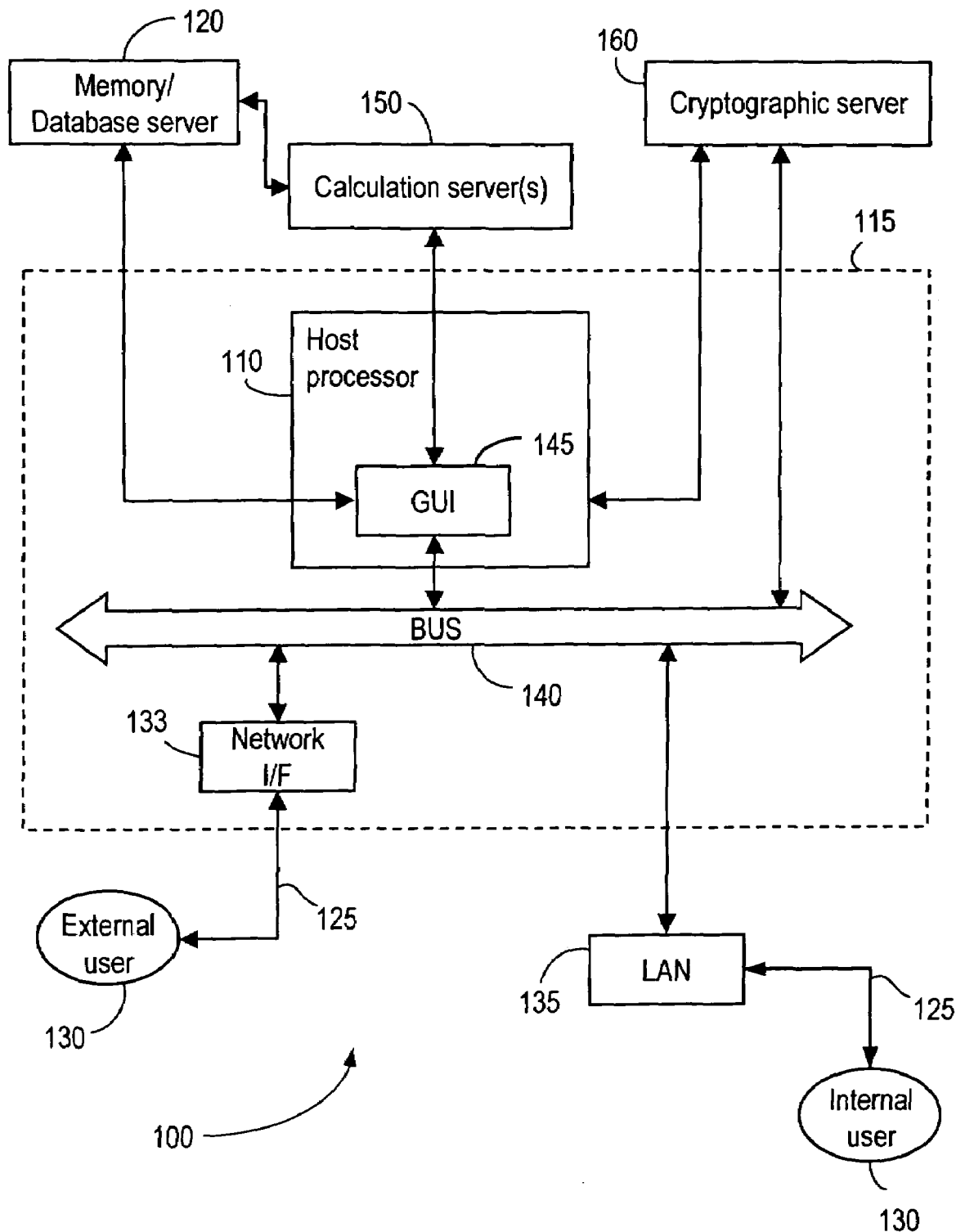
FIG. 1 illustrates an arrangement for implementing the method in accordance with an exemplary embodiment of the invention.

FIG. 1 illustrates an arrangement 100 for implementing the method in accordance with and exemplary embodiment of the invention. Referring to FIG. 1, arrangement 100 may include a processor 110 that communicates with an internal memory 120, which may contain one or more subordinate databases that stores a response surface to be used in determining the desired fresh fuel bundle design applicable for N bundle groups, for example.

In general, a response surface is an extremely fast-running transfer function where input 'X' variables (independent variables such as control blade positions, exposed fuel placements, etc.) to the transfer function generate output 'Y' variables (dependent variables such as core limits MFLPD, MAPLHGR, MFLCPR, etc., and cycle energy). By fast-running, the response surface runs in less than 0.1 second versus greater than 5 minutes for a conventional core or bundle simulator, for evaluating a given, candidate bundle or core design. This may allow a search algorithm (which may be embodied as an optimization search routine) to examine tens of thousands of solutions (such as candidate fresh fuel bundle design solutions) in the same time it would take to examine only a few solutions if one were only utilizing the bundle and core simulators alone. The response surface may be generated in advance by running hundreds of simulator cases up-front (which generates derivatives for the RS).

Memory 120 may include a fuel rod types database that stores a plurality of different fuel rod types and associated rod characteristics. This database of stored rod types may be a set of standardized rod types adapted for use in one or more cores of one or more nuclear reactor plants, for example, as described in the co-pending '358 application to Kropaczek et al. Conventional design processes typically utilize any number of different rod types without regard to cost or performance, in developing fuel bundle designs for a particular core of a particular nuclear reactor plant. However, in accordance with the exemplary embodiments, a specified, standardized set of rod types selected from the fuel rod types database may be may used in order to determine a desired fresh fuel bundle design. Accordingly, a potentially limitless amount of fuel bundles may be fabricated using a reduced number of different fuel rod types, which may allow for greater efficiency and flexibility in core design, reduced manufacturing costs, with potentially improved safety margins to core thermal limits.

Processor 110 represents a central nexus from which real time and non-real functions in arrangement 100 may be performed, such as graphical-user interface (GUI) and browser functions, directing all calculations and accessing of data in order to determine a desired fuel bundle design, and for the creation of suitable graphical representations of various results associated with determining a desired fuel bundle design for N bundle groups of a core. For example, processor 110 may be constructed with conventional microprocessors such as currently available PENTIUM processors.

Arrangement 100 could be embodied as a network. Processor 110 could be part of an application server 115 (shown in dotted line) on the network for access by both internal and external users 130, via suitable encrypted communication medium such as an encrypted 128-bit secure socket layer (SSL) connection 125, although the present invention is not limited to this encrypted communication medium. Hereinafter, the term user may refer to both an internal user and an external user. A user could connect to the network and input data or parameters over the internet from any one of a personal computer, laptop, personal digital assistant (PDA), etc., using a suitable input device such as a keyboard, mouse, touch screen, voice command, etc., and a network interface 133 such as a web-based internet browser. Further, processor 110 on such a network could be accessible to internal users 130 via a suitable local area network (LAN) 135 connection, for example.

The graphical information may be communicated over the 128-bit SSL connection 125 or LAN 135, to be displayed on a suitable terminal unit such as a display device of the user 130, PDA, PC, etc. For example, a user 130 may be any of a representative of a nuclear reactor plant accessing the website to determine a fresh fuel bundle design for a core of his or her nuclear reactor, a vendor hired by a reactor plant site to develop fresh fuel bundle designs using the exemplary embodiments of the present invention, or any other user authorized to receive or use the information generated by the exemplary embodiments of the present invention.

Processor 110 may be operatively connected to a cryptographic server 160. Accordingly, processor 110 may implement all security functions by using the cryptographic server 160, so as to establish a firewall to protect the arrangement 100 from outside security breaches. Further, cryptographic server 160 may secure all personal information of all users registered with a website hosting a program implemented by the method and arrangement 100 in accordance with the exemplary embodiment of the invention.

If processor 110 is part of an application server 115 on a network, for example, conventional bus architectures may be used to interface between components, such as peripheral components interconnect (PCI) bus (140) that is standard in many computer architectures. Alternative bus architectures such as VMEBUS, NUBUS, address data bus, RAMbus, DDR (double data rate) bus, etc. could of course be utilized to implement such a bus.

Processor 110 may include a GUI 145, which may be embodied in software as a browser. Browsers are software devices which present an interface to, and interact with, users of the arrangement 100. The browser is responsible for formatting and displaying user-interface components (e.g., hypertext, window, etc.) and pictures.

Browsers are typically controlled and commanded by the standard hypertext mark-up language (HTML). Additionally, or in the alternative, any decisions in control flow of the GUI 145 that require more detailed user interaction may be implemented using JavaScript. Both of these languages may be customized or adapted for the specific details of a implementation, and images may be displayed in the browser using well known JPG, GIF, TIFF and other standardized compression schemes, other non-standardized languages and compression schemes may be used for the GUI 145, such as XML, "homebrew" languages or other known non-standardized languages and schemes.

As noted above, processor 110 may perform all the calculations required to process user entered data, such as generation of a response surface model based on rod-by-rod changes made in one or more reference fresh fuel bundle designs for N fresh fuel bundle groups to be evaluated, and storing the response surface in memory 120, iteration of a search algorithm using the response surface to determine an accepted fresh fuel bundle design for the N bundle groups, and to provide results data. Exemplary results data associated with an accepted fresh fuel bundle design may be embodied as a two-dimensional (2-D) Uranium-235 enrichment and Gadolinium distribution map as a function of axial height with estimated R-factor and local peaking data, on a rod-by-rod basis, for a particular accepted fresh fuel bundle design, for example, and/or other plant related data, such as margins to certain core thermal limits (e.g. MFLCPR, MFLPD, and MAPLHGR) and reactivity margins (e.g. cold shutdown margin and hot excess reactivity) associated with the accepted fresh fuel bundle design. This data may be displayed on a suitable display, via the GUI 145, under the direction of processor 110.

Memory 120 may be integral with processor 110, external, configured as a database server, and/or may be configured within a relational database server, for example, that may be accessible by processor 110. Memory 120 may store a response surface model generated by perturbing the reference bundle design(s) on a rod-by-rod basis in given (i,j) rod locations to be evaluated, and the aforementioned rod types database, to be described in further detail hereafter. The response surface model, or actual Nuclear Regulatory Commission (NRC)-approved fuel bundle simulation codes such as TGBLA or CASMO, for example, may be used by processor 110 to determine desired changes to be made across fuel bundles in each of N fresh fuel bundle groups being evaluated.

Alternatively, instead of processor 110 performing the calculations, processor 110 may direct a plurality of calculation servers 150, which could be embodied as Windows 2000 servers, for example, to perform calculations for generating the response surface, iterating the search algorithm, performing objective function calculations, and/or performing one (or more) optimization routines for generating the response surface, iterating the search algorithm and performing objective functions calculations, so as to reduce processing time in converging to an accepted fresh fuel bundle design. Further, the exemplary embodiments of the present invention may be implemented by a software program driven by processor 110 and implemented at the calculation servers 150, with calculation servers having access to memory 120.

Exemplary embodiments of the present invention may generate and utilize a response surface to define relationships between individual (single) fuel rod type changes made in reference fresh fuel bundle designs to be evaluated for N bundle groups, and user-defined target conditions that should be met, such as local bundle constraints, i.e. local peaking, R-factor, bundle average enrichment, hot and cold $k_\infty$, where $k_\infty$ is the neutron multiplication factor for a core of infinite size, used to determine core reactivity levels; global core constraints, i.e., MAPLHGR, MFLCPR, MFLPD, cold shutdown margin (CSDM), hot excess reactivity, etc., and certain manufacturing constraints such as the number of unique fuel rod types for the core being evaluated and/or for one or more bundles of the evaluated core, for example. The response surface is thus used to generate a plurality of candidate fresh fuel bundle designs by combining the outputs of multiple fuel rod changes across the N bundle groups using the principles of superposition to combine several of the outputs of single-rod changes for creating the candidate bundle design solutions. An objective function value is calculated for each candidate design solution to determine a desired or acceptable fresh fuel bundled design for all N bundle groups that satisfies the user-defined target conditions.

Figure 2:
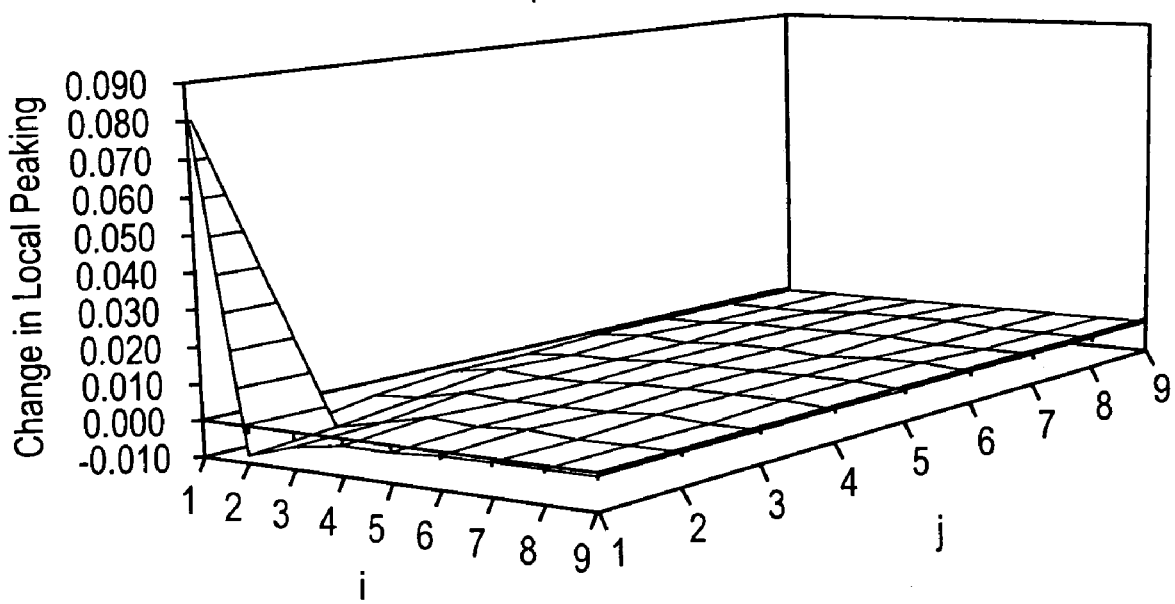
FIG. 2 illustrates an impact on local power peaking distribution resulting from a change in a single fuel rod in accordance with an exemplary embodiment of the invention.

FIG. 2 illustrates an impact on an exemplary target condition (local power peaking distribution) resulting from a change of a single fuel rod in a given bundle in accordance with the exemplary embodiments of the present invention. FIG. 2 graphically illustrates an individual rod-change perturbation within a response surface for a single rod location in a bundle. In this exemplary case, rod locations for an exemplary 9×9 fuel bundle are shown, with (i, j) notation representing fuel rod locations in the bundle. Thus, at (1,1), the rod average enrichment has been increased by 0.2 wt % U235. As a result of this change in enrichment at the (1,1) location, the local peaking in the (1,1) location increased by approximately 0.08 and the local peaking in the (2,1) location and (1,2) location decreased by approximately 0.01.

A fuel rod-types database consisting of plurality of individual fuel rod designs or "fuel rod types" (enrichment and gadolinium distributions) may be used as the basis for developing the response surface for fuel rod changes. A given fuel rod within the database is uniquely determined by the number of axial zones, whether the fuel rod is a bundle tie rod, part length rod, or interior rod, and the composition (U-235 enrichment and gadolinium weight).

The response surface is created by performing, for each (i,j) location in a given bundle of a reference fresh fuel bundle design, an exchange of the current fuel rod type at that (i,j) location for a fuel rod type from the fuel rod types database. The given bundle may be located in one or several core locations, and may be part of a bundle group.

A bundle simulation of the bundle design is performed which provides various bundle outputs such as R-factor distributions, local peaking distributions, bundle average enrichment data, etc. These outputs from the bundle simulation are then used as inputs to a core simulation, with the core simulation representing the effect on a virtual core loaded in accordance with the perturbed bundle design (i.e., the effect of perturbing a single fuel rod within the fresh bundle design), for each occurrence of the perturbed fresh bundle design within the core being evaluated. Outputs from the core simulation include the resultant values of global core constraints such as MAPLHGR, MFLCPR, MFLPD, CSDM (cold shutdown margin), and hot excess reactivity. The process of perturbing the reference bundle designs with systematic fuel rod types replacement is repeated for each rod type in the fuel rod types database, for each (i,j) rod location in each bundle in each of the N bundle groups according to the evaluated reference design.

The generated response surface thus stored includes a plurality of data sets, each data set including a local response generated in accordance with a bundle simulation of a given perturbed reference bundle design and a global response generated in accordance with a core simulation of a virtual core loaded in accordance with the perturbed bundle design run through the bundle simulation. In other words, the response surface represents the effects of single fuel rod type changes within a batch of identical fresh fuel bundle designs.

Figure 3:
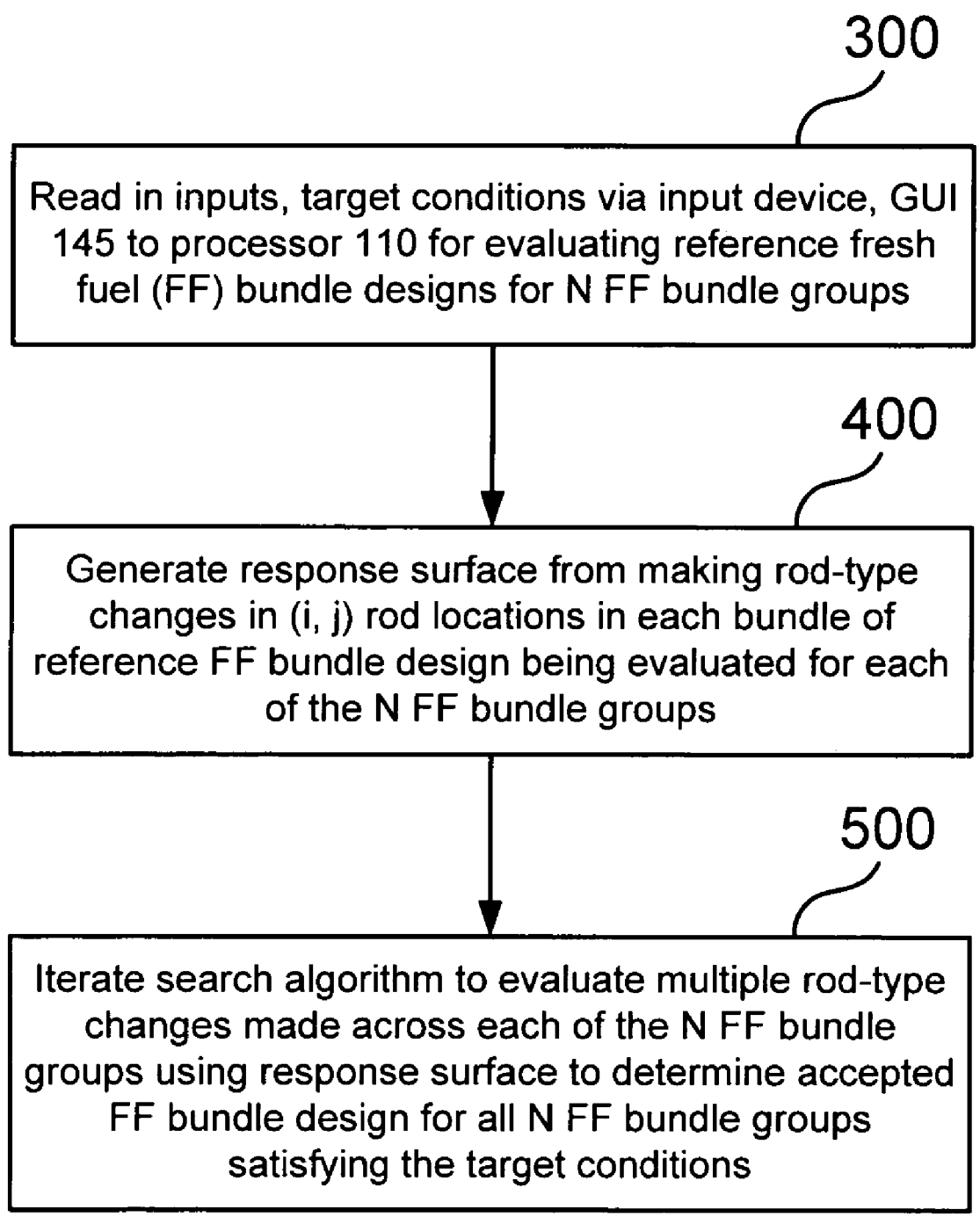
FIG. 3 is a flow chart describing a method of determining a fresh fuel bundle configuration in accordance with an exemplary embodiment of the invention.

FIG. 3 is a flow chart describing a method determining a fresh fuel bundle design in accordance with an exemplary embodiment of the invention. In FIG. 3, inputs to include user-defined target conditions of a given core may be initially read in (300) to processor 110. A user may enter the inputs and target conditions via an input device (i.e., mouse, touch screen, keyboard, audible command, etc.) and GUI 145, for example. These defined inputs are for evaluating one or more reference fresh fuel bundle designs for each of N fresh fuel bundle groups. Each bundle group may consist of one or a plurality of fresh fuel bundle locations. A given reference fresh fuel bundle design may be understood as including the locations of the bundle groups in the core, and the locations of the bundles in each bundle group. A bundle group may be defined as a number of fresh fuel locations in the core containing an identical fuel bundle design. Each bundle group may therefore contain an initial reference fresh fuel bundle design that will form the basis for the individual fuel rod type perturbations performed in the generation of the response surface. For a core containing N bundle groups, there will be N reference designs, although it is possible that different bundle groups could have identical reference designs.

The inputs may include one or more of an initial core loading pattern for exposed fuel, plant and cycle strategy (including desired energy for the cycle) for the reactor plant being evaluated, control blade pattern, flow, number (N) of bundle groups being to be evaluated for determining the accepted fresh fuel bundle design, existing reference fresh fuel bundle designs to be evaluated or perturbed for each bundle group, rod types available from the fuel rod types database to be swapped for rods in the reference bundle designs to generate the response surface, and rod positions in each of the N bundle groups in which each rod type in the fuel rods type database is swapped for an existing fuel rod, in addition to certain operational and/or core thermal limits, and margins to these thermal limits of the core may also be inputs. This input data may be stored within memory 120, such as within a suitable subordinate database in memory 120, for example.

The user-defined target conditions may include local bundle constraints, global core constraints and manufacturing constraints. The local bundle constraints may include one or more of local peaking, R-factor and average bundle enrichment constraints or limits to be satisfied in the bundles of the accepted fresh fuel bundle design. These are only exemplary bundle constraints, other local bundle constraints are evident to those having ordinary skill in the art. The global core constraints may include one or more of Maximum Fraction of Limiting Power Density (MFLPD), Maximum Average Planar Linear Heat Generation Rate (MAPLHGR), Maximum Fraction of Limiting Critical Power Ratio (MFLCPR), cold shutdown margin and hot excess reactivity constraints or limits (global core thermal limits or global constraints) for the core being evaluated. These are only exemplary global core constraints, other core constraints are evident to those having ordinary skill in the art.

The manufacturing constraints may include a maximum rod type count for the core and a maximum rod type count for the bundles of the accepted fresh fuel bundle design, for example (i.e., there may be a limitation on the number of different rod types used in each bundle and/or across the core). Data related to the user-defined target conditions/limits may be stored in a suitable database (not shown) within memory 120.

After all inputs and limits have been defined, a response surface may be generated (400) based on making single rod-type changes in each (i,j) rod location of each bundle of a given reference bundle design being evaluated for each of the N bundle groups. A search algorithm may then be iterated (500) to evaluate a given combination of multiple rod-type changes made simultaneously across each of the N bundle groups using the generated response surface, so to determine an accepted fuel bundle design for each of the N bundle groups that satisfies the user-defined target conditions. Hereafter, the generation of the response surface and iteration of the search algorithm is described in further detail.

Generating Response Surface from Rod-by-Rod Changes

Figure 4:
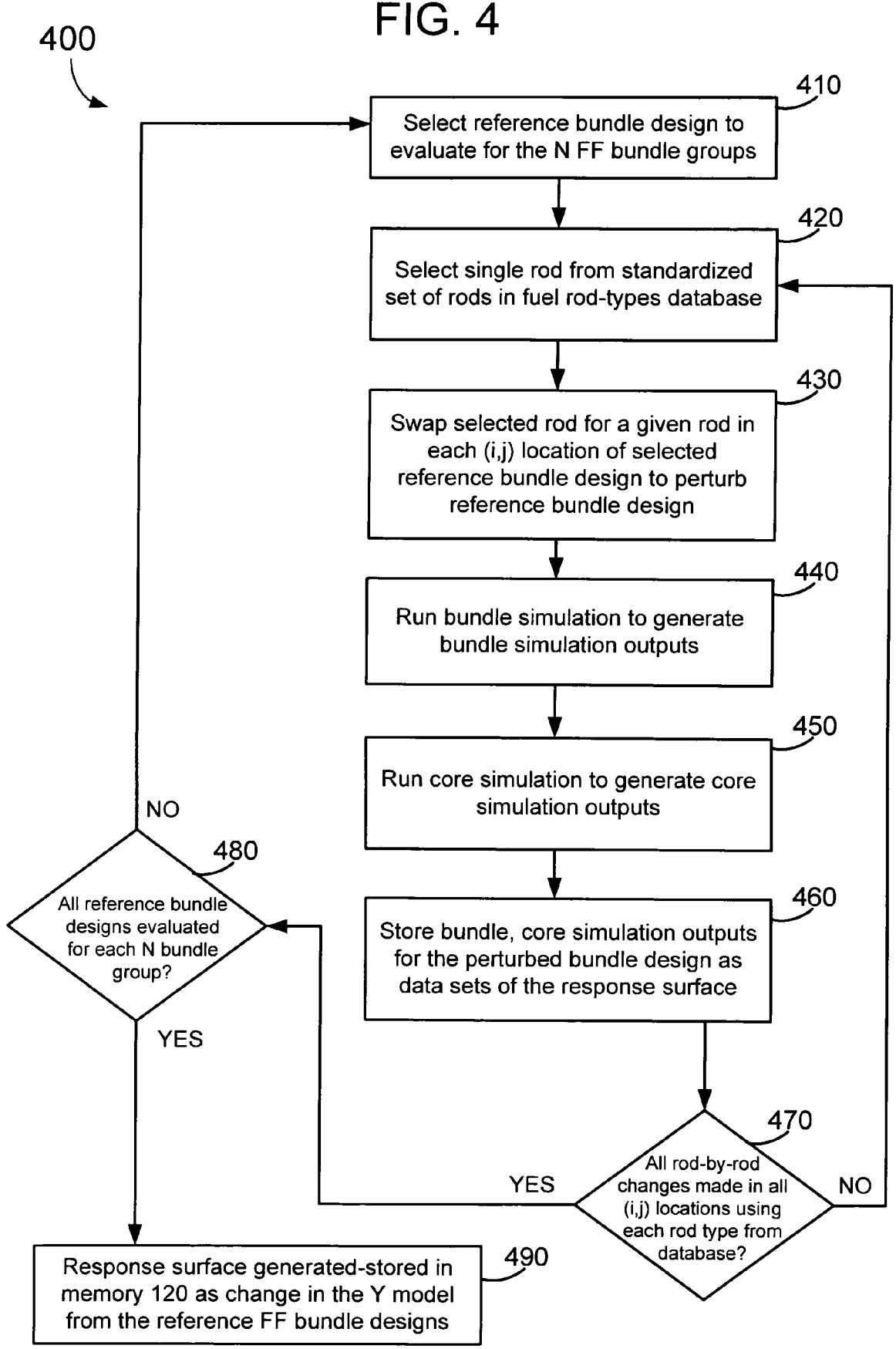
FIG. 4 is a flow diagram describing the generation of the response surface in more detail in accordance with an exemplary embodiment of the invention.

FIG. 4 is a flow diagram describing the generation of the response surface in more detail in accordance with an exemplary embodiment of the invention.

As briefly discussed above, a fuel rod-types database consisting of fuel rod designs (enrichment and gadolinium distributions) may be used as the basis for developing a response surface for single fuel rod changes. As also discussed above, a given fuel rod within the database is uniquely determined by the number of axial zones, whether the fuel rod is a bundle tie rod, part length rod, or interior rod, and the composition (U-235 enrichment and gadolinium weight).

Referring to FIG. 4, for a selected reference bundle design to be evaluated (410), a rod is selected from the standardized set of fuel rod types in the fuel rod types database of memory 120 (420). This may be done manually by the user, via an input device and GUI 145 to select a given rod type, or as part of an optimization performed without user intervention.

The response surface may start to be created by performing, for each (i,j) location in a given bundle, an exchange of the current fuel rod type at that (i,j) location for a fuel rod type within the fuel rod types database (430). The given bundle may be located in one or several core locations, as evident by the reference bundle design, and may be part of one or more of the N bundle groups. In any case, swapping in the "new" rod type for an existing rod in each (i,j) location creates a perturbed reference bundle design, A simulation of the bundle design is performed (440) which provides various bundle simulation outputs such as R-factor distributions, local peaking distributions, bundle average enrichment data, etc. The bundle simulation may be executed by calculation servers 150; however, the bundle simulation may be a bundle simulation process that is run external to the arrangement 100. The user may employ well-known executable Nuclear Regulatory Commission (NRC)-approved fuel bundle simulation codes such as TGBLA or CASMO, for example, or any other known bundle simulator software where the appropriate simulator drivers have been defined and coded, as is known. The calculation servers 150 may execute these bundle simulator programs based on input by the user via GUI 145.

These bundle simulation outputs may be used as inputs to a core simulation (450). The bundle simulation outputs include localized rod interaction data such as R-Factors (used in the calculation of MFLCPR) and local peaking (used in the calculation of MFLPD) as well as homogenized nuclear data (e.g. nuclear cross sections) that are written to a file and represent the core conditions as it relates to fuel temperature, void fraction, pressure, etc. In other words, a virtual core is loaded with perturbed bundles in accordance with the perturbed reference design in order to be simulated. The virtual core is a representative model of the evaluated core that is to be simulated using a known simulator, in order to determine whether any of the user-defined target conditions (local bundle and global core thermal limits) have been violated, and additionally determining what, if any bundles may have excess margins to these limits.

The core simulation may be executed by calculation servers 150; however, the simulation may be a 3D simulation process that is run external to the arrangement 100. The user may employ well-known executable 3D simulator programs such as PANACEA, LOGOS, SIMULATE, POLCA, or any other known simulator software where the appropriate simulator drivers have been defined and coded, as is known. The calculation servers 150 may execute these simulator programs based on input by the user via GUI 145.

The user may initiate a 3D bundle and/or core simulation at any time using GUI 145, and may have a number and different means to initiate a simulation. For example, the user may select a "run simulation" from a window drop down menu, or could click on a "RUN" icon on a webpage task bar, as is known. Additionally, the user may receive graphical updates or status of the simulation. Data related to each simulation of the virtual core may be queued in queue database (not shown) within memory 120. Once the simulation is queued, the user may have an audio and/or visual indication as to when the simulation is complete, as is known.

Once the virtual core has been loaded and a 3D core simulation run, resulting core simulation outputs (i.e., MFLPD, MAPLHGR, MFLCPR values, etc.) may be extracted from the 3D-simulator for all locations in the core, at all exposure points, and at all axial locations, and stored as a data set for the response surface. If desired, this data may be displayed for the user. The bundle simulation outputs and the core simulation outputs for the perturbed bundle design may be stored (460) in a suitable database (not shown) within memory 120.

As shown in FIG. 4, functions 420-460 may be repeated until a rod in each (i,j) rod location being evaluated in each bundle in accordance with each reference fresh fuel bundle design has been replaced with each rod type in the standardized set, the perturbed bundles simulated and the virtual core loaded in accordance with each perturbed bundle design and a core simulation run. The bundle and core simulation outputs for each perturbation may be stored as data sets of the response surface (490).

Accordingly, the core simulation thus represents the effect of perturbing a single fuel rod within the fresh bundle design, for each occurrence of the perturbed fresh bundle design within the core being evaluated. Outputs from the core simulation include the resultant values of global core constraints such as MAPLHGR, MFLCPR, MFLPD, CSDM (cold shutdown margin), and hot excess reactivity. As discussed above, the process of perturbing fuel rod types is repeated for each rod type in the fuel rod types database, for each (i,j) location in each bundle in each of the N bundle groups.

The generated response surface thus stored in memory 120 includes a plurality of stored data sets, each data set including an estimated local response generated in accordance with a bundle simulation of a given perturbed reference bundle design and a global response generated in accordance with a core simulation of the perturbed bundle run through the bundle simulation. In other words, the response surface represents the effects of single fuel rod type changes within a batch of identical fresh fuel bundle designs.

The response surface may be developed in advance and stored in memory 120, or calculated concurrently in real time for the user based on the processing capacity and speed of processor 110 and calculation servers 150. The data sets of the response surface may be calculated and stored for all fuel rod locations (i,j) of each fuel bundle in each of the N bundle groups, and may be spatially and exposure dependent.

Search Algorithm

Figure 5:
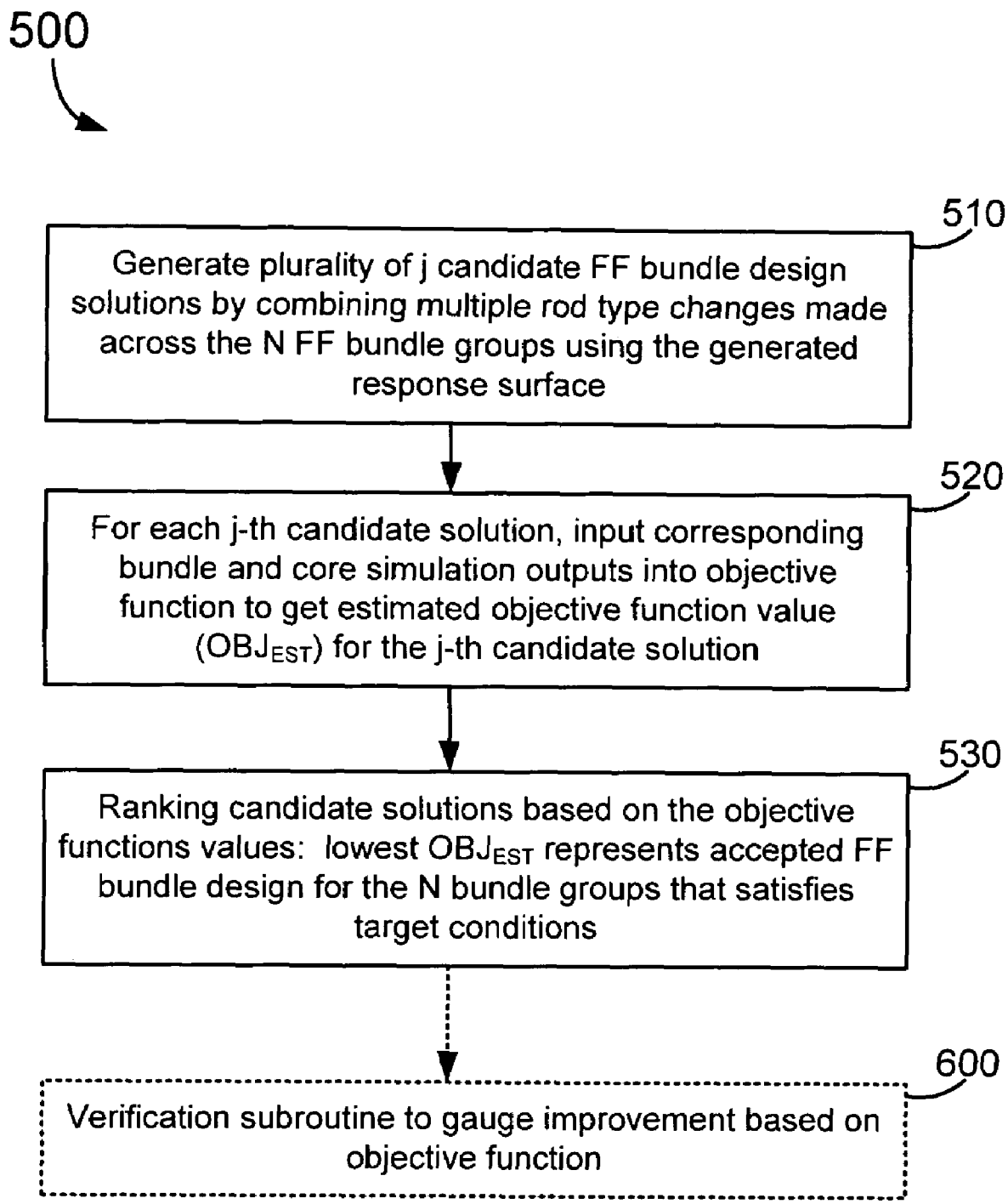
FIG. 5 is a flow diagram describing the search algorithm in more detail, in accordance with an exemplary embodiment of the invention.

FIG. 5 is a flow diagram describing the search algorithm in more detail, in accordance with an exemplary embodiment of the invention. Once the response surface has been generated, the search algorithm may be iterated by processor 100, either upon a command sent by the user via GUI 145, or without any user intervention as part of an optimization routine. The idea is to use the data sets from the stored response surface to generate a substantial number of candidate fresh fuel design solutions (510) by combining multiple rod type changes across all of the N bundle groups being evaluated. This may be done using principles of linear superposition, in which a number of outputs representing single-rod type changes, the data of which is stored as part of the response surface, are combined to create candidate fresh fuel bundle design solution having multiple rod-type changes made therein. These candidate design solutions are to be evaluated using an objective function so as to converge to a desired or accepted fresh fuel bundle design for all N bundle groups.

The following expression (1) illustrates an exemplary calculation for use of a response surface in determining an output Y due to a number of fuel rod type changes $X_i$. In expression (1), $Y_o$ represents the response of the unperturbed core state, $Y_{model}$ represents the response of the perturbed core state, and $\Delta Y_i$ represents the change in response to fuel rod type perturbation i. (the response surface generated in 400 represents the $\Delta Y_i$) Linear superposition is used to sum over all n fuel rod type changes in determining the model response:

$$Y_{model} = Y_0 + \sum_{i=1}^{n} x_i \Delta Y_i, \ x_i \in N \cap [0, 1] \tag{1}$$

The responses $Y_{model}$ represent the set of outputs from both the bundle simulation and core simulation. Each candidate design solution will therefore have a calculated $Y_{model}$ based on a response surface evaluation according to expression (1). As discussed earlier, bundle simulation outputs include R factors, local peaking and average bundle enrichment. Core simulation outputs include MAPLHGR, MFLPD, MFLCPR, CSDM values, etc.

Referring now to FIG. 5, for each j-th candidate design solution, the stored bundle and core simulation outputs corresponding to the candidate solution are input to an objective function, so as to determine an estimated objective function value $OBJ_{EST}(j)$ for a candidate solution generated from multiple rod-type changes, where j=1 to N, for each candidate design solution.

In general, an objective function is a mathematical equation that incorporates the user-defined target conditions (local, global and manufacturing constraints) and quantifies the candidate bundle design's adherence to the target conditions. For example, based upon the results of the calculated objective function values, the user may be able to determine if a particular candidate bundle design meets the user's target conditions. The objective function itself, and calculated objective functions values may be stored in an objective function values database within relational database server (memory 120).

An objective function value for each candidate design may thus be calculated for each individual constraint, and for all constraints as a whole, where all constraints represent the entity of what is being evaluated in a particular core. An individual constraint component of the objective function may be calculated as described in expression (2):

$$OBJ_{par} = MULT_{par} * (RESULT_{par} - CONS_{par}). \tag{2}$$

In expression (2) "par" may be any of the user-defined target conditions or other input limits such as cycle energy, flow, etc. It is to be understood that these target conditions are not the only parameters that could be possible candidates for evaluation, but are parameters which are commonly used in order to determine a suitable fresh fuel bundle design for a core of a nuclear reactor. The total objective function may be a summation of all constraints, or $$OBJ_{TOT} = SUM(par=1, 31)\{OBJ_{par}\}. \tag{3}$$

In expression (3), thirty-one (31) different constraints (e.g., global or local thermal limits which comprise the user-defined target conditions) are indicated, it being understood that fewer or greater than 31 constraints could be selected for a given objective function calculation. Exemplary constraints to be evaluated in the objective function may include one or more of maximum values of MFLCPR, MFLPD, MAPL-HGR, integrated power, hot excess reactivity slope, nodal exposure ratio (NEXRAT), bundle average exposure at end-of-cycle (EOC); maximum and minimum values for % core flow, % hot excess reactivity, average void fraction, axial void tilt, axial power tilt and axial peak; eigenvalue (Δcycle) and EOC eigenvalue upper and lower tolerances, minimum cycle length (MWD/st) and minimum % shutdown margin, for example. Additionally, expressions (2) and (3) are only exemplary equations for calculating objective function values, the exemplary embodiments are not so limited to objective function values calculated based on expressions (2) and (3).

Referring now to expression (2), if RESULT is less than CONS (e.g. there is no violation of a given user-defined target condition), the difference is reset to zero and the objective function will be zero. Accordingly, objective function values of zero indicate that a particular constraint has not been violated. Positive values of the objective function represent violations that may require correction. Additionally, the estimated bundle and core simulation outputs may be provided in the form of spatial coordinates (i, j, k) and time coordinates (exposure step) (e.g., particular time in a core-energy cycle). Therefore, the user can see at which time coordinate (e.g., exposure step) a problem is located. Hence, the core (based on the fresh fuel bundle design) is modified to affect only the identified exposure step.

In addition, objective function values may be calculated as a function of each exposure step, and totaled for the entire fresh fuel bundle design problem. The objective function values calculated for each constraint, and the objective function values per exposure step, may be further examined by normalizing each objective function value to provide a percentage contribution of a given constraint to a total objective function value. The objective function values may be utilized in the manual determination of fuel bundle design development. For example, the values of the objective function calculations may be viewed graphically by the user in order to determine parameters that violate limits. These graphical representations may include 2D views of the local bundle and/or global core constraint values as a function of core exposure resulting from the core simulation, as compared to the user-defined target conditions (i.e., limits and/or margins to the limits), for example.

Accordingly, the candidate design solutions can be ranked (530) by their calculated estimated objective function values. The lowest positive-valued $OBJ_{EST}(j)$ corresponds to the 'best estimate' of a candidate fresh fuel bundle design solution for multiple rod type changes across the N bundle groups.

This may be selected as the desired or acceptable fresh fuel bundle design which satisfies the user-defined target conditions.

Data related to the acceptable fresh fuel bundle design for the given core that satisfies the user-defined target conditions may be output to the user. For example, processor 110, via graphical user interface GUI 145, may output a suitable graphical display of local bundle data such as a target enrichment distribution map, and additional enrichment data related to estimated local peaking and estimated R-factor values, based on the applied multiple-fuel rod type changes, and/or a display of global data such as MAPLHGR, MFLPD, MFLCPR, CSDM values as a function of exposure.

For the accepted fresh fuel bundle design, the user may desire to verify that the accepted fresh fuel bundle design is the most optimal or desired design for the N bundle groups being evaluated, and/or to gauge whether any improvement is possible. Accordingly, the user may implement a verification subroutine (600) via GUI 145, or such a routine can be done autonomously without user intervention as part of an optimization routine which iterates the search algorithm. The idea is to determine if any improvement in the objective function can be made as to the lowest positive-valued $OBJ_{EST}(j)$ FIG. 6 is a flow diagram illustrating the verification subroutine for the accepted fresh fuel bundle design in more detail, in accordance with an exemplary embodiment of the invention. In an example, any change in objective function values calculated from previous core simulations of the virtual core provides the user with a gauge to estimate improvement (or lack thereof) in their proposed design. Increases in an objective function value over several iterations indicate that the user's changes are creating a fresh fuel bundle design that is moving away from a desired solution, while successive iterations of lesser objective functions values (e.g., the objective function value decreasing from a positive value towards zero) may indicate improvements in the iterative core design. Since the objective function values, user-defined target conditions and bundle/core simulation outputs over successive iterations may be stored in various subordinate databases within memory 120, designs from past iterations may be quickly retrieved, should later modifications prove unhelpful.

Referring to FIG. 6, for the accepted fresh fuel bundle design, a bundle simulation may be run for the bundles of the design so as to generate actual bundle simulation outputs (610). A virtual core loaded in a accordance with the accepted fresh fuel bundle design may then be simulated to generate actual core simulation outputs (620). The actual core and bundle simulation outputs, together with the user-defined target conditions, may serve as inputs to the objective function so as to calculate an actual objective function value ($OBJ_{ACT}$) for the accepted fresh fuel bundle design (630).

These functions may be performed by the host processor 110 or by one or more of the calculation servers 150 iterating the known bundle and core simulation software programs described above, either upon direction from the user via GUI 145, or as part of an optimization process which automates the simulation functions and calculation of objective function values using the same objective function Upon completion of the objective function calculation, the user may be provided with data related to the objective function calculations, which may include any local bundle and/or global core thermal limits that have been violated during the simulation of an evaluated core loaded in accordance with a given candidate fresh fuel bundle design solution. Graphical data may be displayed by the user after each iteration, if desired, such as a displayed list of constraint parameters which may represent the user-defined target conditions or limits, and the values of each of objective function value calculation on a per constraint basis. Conditions/limits which have been violated may be highlighted with a suitable graphical indicator, and for each violation, its contribution and percent (%) contribution may also be displayed.

By interpreting the graphical data, the user will be able to determine if the $OBJ_{ACT}$ is equal or within an acceptable margin to the $OBJ_{EST}$. As an example, $OBJ_{ACT}$ might be greater than $OBJ_{EST}$ by 1%. Upon closer examination of the individual constraint components, it is realized that the primary contributor to the deviation is MFLPD where it is revealed, and consequently deemed unacceptable, that there is greater than a 1% deviation in the individual nodal predictions of kW/ft. Thus, if the $OBJ_{ACT}$ is equal or within an acceptable margin to the $OBJ_{EST}$, (output of 640 is 'YES') the user may be provided with a report of results that may include the design parameters for the accepted fresh fuel bundle design (most of which are known to the user since these were entered by the user as inputs and/or user-defined target conditions), and margins to the user-defined target conditions, for example.

If based on a review of the graphical data provided by the user after the simulations and calculation of the actual objective function value, the $OBJ_{ACT}$ is not equal or within an acceptable margin to the $OBJ_{EST}$, the user may set the accepted fresh fuel bundle design as the reference fresh fuel bundle design (650) and iteratively repeat 410-490 from FIG. 4 (650) to generate a revised response surface, then iteratively repeat 510-530 in FIG. 5 (660) and the verification subroutine in 610-630 of FIG. 6 (670) in an effort to find improvement in the objective function.

Accordingly, based on this data provided the user after the initial run of 610-630, the user may be provided with one or more recommendations as to what modifications need to be made to the core design (and hence the accepted fresh fuel bundle design), if any, for a subsequent iteration. Such changes could be made, if desired, to the inputs and or user-defined target conditions prior to regenerating a revised response surface, or as part of perturbing the revised reference bundle design with rod types during the regeneration of the response surface in 410-490, for example.

Although the individual modifications may alternatively be left to the desires of the user, procedural recommendations may be provided in the form of a pull down menu on a display, for example. These recommendations may be divided into categories such as energy beneficial moves, energy detrimental moves, and converting excessive margin (from thermal limit) into additional energy, although other categories could be developed. A preferred technique is to address problems using energy beneficial moves rather than energy detrimental moves. Even if the accepted fresh fuel bundle design (and hence core design) meets all of the target conditions and inputs (client-inputted plant specific constraints, design limits, thermal limits, etc.) the user may verify that any excessive margin to a particular constraint or limit is converted into additional energy. Accordingly, the following logic statements may represent exemplary procedural recommendations, it being understood that the exemplary embodiments of the present invention are not limited solely to these recommendations:

Energy Beneficial Moves

If Critical Power Ratio (CPR) margin is too low towards core perimeter, bring more reactive fuel toward core center If NEXRAT (Nodal Exposure Ratio, a thermal margin constraint) problem at end-of-cycle (EOC), move more reactive (e.g., less exposed) fuel to problem location If Cold Shutdown Margin (CSDM) problem at perimeter of core at beginning of cycle (BOC), place less reactive fuel towards perimeter Energy Detrimental Moves
If CPR margin too low at EOC, move less reactive fuel into problem location
If kW/ft margin too low at EOC, move less reactive fuel into problem location Converting Excessive Margin into Additional Energy
If extra CPR margin in center of core at EOC, move more reactive fuel from perimeter locations to core center By invoking such procedural recommendations, the user can iteratively refine the accepted fresh fuel bundle design until a calculated actual objective value is either equal or within an acceptable margin to the lowest objective function value calculated at 530 in FIG. 5 that corresponds to the selected candidate design solution from the superposition of multiple rod changes. In FIG. 6, functions 610-630 may thus be iteratively repeated until (a) no further improvement could be made in the fresh bundle design or (b) the calculated objective function value from actual bundle and core simulation had converged to an acceptable solution. Only then would the designer or user consider the procedural recommendations described above.

Note that modifying the fresh and exposed locations according to the procedural recommendation may result in the user redefining his bundle groups. For purposes of the repeat of 610-630, the bundle groups are fixed. Each bundle group during the repeat of 610-630 will end up with a new bundle design for each iteration.

As always, the graphical data provided to the user, such as local bundle constraint values (R-factor, average bundle enrichment, local peaking, etc.) and global core constraint values MFLPD, MAPLHGR, MFLCPR, etc., may be extracted from the 3D-simulator for all locations of the revised accepted fresh fuel bundle design in the core, at all exposure points, and at all axial locations. This enables radial and axial dependent trends to be revealed, to gauge whether there is improvement shown in the objective function in converging to a desired solution.

Optimization to Reduce Processing Time

Alternatively, optimization techniques may be used to substantially reduce processing time for generating the response surface and/or iterating the search algorithm to converge to a desired fresh fuel bundle design. For example, optimization can systematically change individual enrichment and burnable poison values in the fuel bundle (i.e., iteratively perform the swap and replace of different rod types from the fuel rod types database at each (i,j) location of a given reference bundle design for each of the N bundle groups being evaluated), generate candidate fresh fuel bundle solutions for a plurality of simultaneous rod changes made across the N FF bundle groups using the response surface, and calculation of the objective function values for each candidate solution to determine whether each change should be kept (and stored in memory 120), thus optimizing the set of fuel rod type changes that create a desired fresh fuel bundle design for the N bundle groups of the core being evaluated.

This may be performed iteratively; i.e., changing rod types in a given rod location in the fuel bundle, for each rod location and each of a plurality of given different rod types, and storing the responses of the bundle and core simulation as data sets to be used in generating the candidate fuel bundle design solutions using principles of linear superposition to make multiple rod type changes to the reference bundle designs using the stored data sets of the response surface, thereby creating a plurality of candidate fresh fuel design solutions to be evaluated in the objective function.

During the optimization, an exhaustive enumeration of fuel rod types and bundle (I,J) positions may thus be explored, and changes may be accepted according to the optimization technique or algorithm selected, and hence based on calculated objective function values. The objective function, initially outlined in expressions (2) and (3), may be stated even more generically by expression (4):

$$\sum_P \sum_E p_{model} - p_{target}, \; p \in P, \qquad (4)$$

where P denotes the set of parameters to be optimized (which could be one or more of the user-defined target conditions, in addition to meeting a target cycle energy at specified inputs for flow, control blade patterns, etc.), and E denotes exposure.

The optimization technique may thus determine the candidate fuel bundle design solution with the highest ranked (lowest, positive valued) objective function value. This may be accepted as an accepted fresh fuel bundle design after each complete sweep (each i,j-th location has been subjected to a fuel rod type change) through each bundle of the N bundle groups, until all fuel rod type changes have been made at each i-th location.

The objective function employed (and how the highest ranked objective function value is selected) may be optimization-algorithm dependent, for example.

A user may thus employ arrangement 100 to automate (or to control such operations manually via GUI 145) subsequent iterations of setting a revised reference fresh fuel design, perturbing the design to generate candidate bundle solutions from multiple rod-type changes, calculation of revised estimated lowest objective function value and then verification through bundle/core simulation of the selected candidate design to output actual bundle and core simulation results graphically for the user to determine if any improvement exists in the objective function. Thus, one or more fresh fuel bundles may be manufactured based on the accepted fresh fuel bundle design and associated data related to this desired fuel bundle design, as may be reflected by the data resulting from the bundle and core simulations.

Optimization Algorithms

An optimization technique for the exemplary embodiments may be selected from one of a deterministic-based optimization algorithm and a random-based optimization algorithm. An example of a deterministic-based optimization algorithm is a method of steepest descent. In a steepest descent optimization, each (i,j) rod position in each fuel bundle of a reference bundle design for the N bundle groups may be methodically analyzed with each different rod-type inserted therein. In other words, each rod type is tried in each location, and, as part of the optimization, an objective function is run for each fuel bundle design to get an estimated objective function value. The lowest, positive objective function value represents the highest ranked estimated objective function value in terms of a fuel bundle design with estimated bundle and estimated core simulation outputs (the local and global constraints, rod-type constraints) closest to the target user-defined constraints, without violating any of one constraint (or which has the fewest number of violators).

Hence, the candidate fresh fuel bundle solution with the lowest estimated objective function value may be selected as accepted fresh fuel bundle design, or further evaluated as part of the verification subroutine by actual bundle simulation and insertion into the virtual core for core simulation, so as to generate the actual bundle and core simulation outputs that are inputs to the objective function to determine whether any improvement is possible (comparing the actual objective function value to the estimated objective function value).

Simulated annealing is an example of a random-based optimization algorithm. The simulated annealing optimization algorithm looks to avoid local minima when searching for a global minimum by occasionally accepting "bad" changes in order to fully explore the search space. This is in contrast to steepest descent, which always accepts the best choice in an iteration, and tends to get caught in local minima. With simulated annealing, a rod-type from the fuel rod types database of memory 120 and a rod position in the reference bundle design (or initially accepted fresh fuel bundle design) are randomly selected. The change in enrichment for inserting that rod in the chosen (i,j) rod location is determined and the objective function computed (via the response surface). Then the objective function value is tested: if it shows improvement as to the initial objective value that the fuel bundle had without being changed, then the design corresponding to that objective function value is accepted.

If the change yields a higher objective function value (i.e., the changed bundle design is worse than the existing reference or accepted fuel bundle design), then the change is accepted with decreasing probability as iterations increase. Thus, initially, many "bad" changes are accepted, while towards the end of the optimization, very few "bad" changes are accepted. Mathematically, this probability of acceptance may be described by expression (5):

$$p = e^{-\frac{\Delta F}{T(n)}}, \quad (5)$$

where $\Delta F$ is the objective function change between the currently accepted and new fresh fuel bundle designs and $T(n)$ may be a temperature defined by expression (6):

$$T(n+1) = T(n) * \alpha \quad (6)$$

where n is the iteration number and $\alpha$ is the "cooling" constant, i.e., the rate at which the temperature decreases. A higher (slower) rate insures that the search space is properly explored, while a lower (faster) rate can cause the optimization to settle on a local minima. A set number of rod changes may be tried at each iteration, such as any number of set changes from a few to several thousand, and preferably about 100 to 1000. All of these parameters have defaults in the GUI 145, but may be changed by the user for an atypical optimization run.

As previously discussed, an objective function may be employed to evaluate each rod type change in each rod location, to determine an objective function value for a fuel bundle design with the rod type change in the particular rod location. The fuel bundle design with the lowest (i.e., highest ranked) objective function value may be selected as the (revised) candidate fresh fuel bundle design for verification by bundle simulation and core simulation to generate the actual bundle and core simulation outputs that are evaluated in the objective function to gauge improvement.

Resulting MFLPD, MAPLHGR, and MFLCPR values may be extracted and graphically displayed from the 3D-simulator for the user, for all locations of the test fuel bundle in the core, at all exposure points, and at all axial locations. This enables radial and axial dependent trends to be revealed. Further, with the user-defined target conditions and/or other inputs or limits, and 3D-simulator results identified above available to the user, violators may be identified in the core, and procedural recommendations may be provided to the user to modify the accepted fresh fuel bundle design for re-evaluation in regenerating a revised response surface, a revised set of candidate fresh fuel bundle design solutions, and re-iteration of the objective function to converge to a desired fresh fuel bundle design that shows improvement, as discussed with respect to FIG. 6.

The exemplary embodiments of the present invention may provide several advantages. Use of the response surface and objective function with coupled 3-D simulator and bundle design codes for performing fresh fuel bundle design may substantially reduce man hours with reduced human error so as to realize a fresh fuel bundle design (and hence core design) with improved fuel cycle economics, fresh fuel utilization and potentially greater operational flexibility. Using a standardized set of rod types in developing a design solution may reduce manufacturing costs as fewer pellet and rod types would be used in determining the desired fresh fuel bundle design.

Setting up the design problem and automating several functions such as generation of the response surface, bundle and core simulation and calculation of the objective function within the context of a GUI and internet accessibility may further reduce man-hour requirements and provide greater design flexibility. Automating the above functions in converging to a desired fresh fuel bundle design for given inputs and user-defined target conditions utilizing optimization may further reduce human error in facilitating an even more expedient design solution. Providing procedural recommendations based on a given design not meeting the user-design conditions reduces the guess work involved to help facilitate a desired fresh fuel bundle design solution and hence core design.

The exemplary embodiments of the present invention being thus described, it will be obvious that the same may be varied in many ways. Such variations are not to be regarded as a departure from the spirit and scope of the exemplary embodiments of the present invention, and all such modifications as would be obvious to one skilled in the area intended to be included within the scope of the following claims.

What is claimed:

1. A method of determining a fresh fuel bundle design for a core of a nuclear reactor, comprising:

defining a plurality of inputs including user-defined target conditions for evaluating fuel rod type configurations of one or more reference fresh fuel bundle designs for each of N bundle groups;

generating a response surface based on making single fuel rod-type exchanges in each (i,j) rod location of each bundle of a given reference bundle design being evaluated for each of the N bundle groups, the response surface including a plurality of transfer functions;

iterating a search algorithm to evaluate a given combination of multiple fuel rod type exchanges made simultaneously across each of the N bundle groups using the generated response surface to generate candidate fresh fuel bundle design solutions and determine an accepted fresh fuel bundle design for each of the N bundle groups that satisfies the user-defined target conditions; and outputting data related to the accepted fresh fuel bundle design that satisfies the user-defined target conditions for each of the N bundle groups for display to a user, wherein generating the response surface includes perturbing a given reference bundle design for each of the N bundle groups by making a single fuel rod exchange at each (i,j) location of a given bundle in accordance with the given reference bundle design for each of the N bundle groups, wherein each of a plurality of fuel rod types stored in a fuel rod types database is selected to replace a given rod in each (i,j) location in a given bundle so as to generate a plurality of perturbed bundle designs for each of the N bundle groups, performing a bundle simulation of each of the bundles of the perturbed design to generate corresponding bundle simulation outputs, performing a core simulation of a virtual core loaded with the perturbed bundles of the perturbed design to generate core simulation outputs, and storing the bundle simulation outputs and core simulation outputs as data sets of the response surface, each data set of the response surface including a local response generated in accordance with a bundle simulation of a given perturbed bundle design due to the single fuel rod exchange and a global response generated in accordance with a core simulation of the perturbed bundle run through the bundle simulation.

2. The method of claim 1, wherein the inputs include one or more of an initial core loading pattern for exposed fuel, plant and cycle strategy for the reactor plant being evaluated, control blade pattern, core flow, number (N) of bundle groups to be evaluated for determining the accepted fresh fuel bundle design, existing reference fresh fuel bundle designs to be evaluated or perturbed for each bundle group, fuel rod types available from a fuel rod types database to be swapped for rods in the reference bundle designs to generate the response surface, and fuel rod positions in each of the N bundle groups in which each fuel rod type in the fuel rod types database is swapped for an existing fuel rod.

3. The method of claim 1, wherein the target conditions include local bundle constraints, global core constraints and manufacturing constraints.

4. The method of claim 3, wherein
the local bundle constraints include one or more of local peaking, R-factor and average bundle enrichment constraints to be satisfied in the bundles of the accepted fresh fuel bundle design,
the global core constraints include one or more of Maximum Fraction of Limiting Power Density (MFLPD), Maximum Average Planar Linear Heat Generation Rate (MAPLHGR), Maximum Fraction of Limiting Critical Power Ratio (MFLCPR), cold shutdown margin and hot excess reactivity constraints, and
the manufacturing constraints include one or both of a maximum fuel rod type count for the core and a maximum fuel rod type count for the bundles of the accepted fresh fuel bundle design.

5. The method of claim 1, wherein iterating the search algorithm includes:
generating a plurality of candidate bundle design solutions resulting from multiple fuel rod-type exchanges made simultaneously across each of the N bundle groups using the response surface to obtain, for each given candidate design, bundle simulation outputs and core simulation outputs from the response surface for the given candidate design,
inputting the bundle simulation outputs and estimated core simulation outputs for each candidate design into an objective function to get an estimated objective function value for each candidate solution, and ranking the candidate bundle design solutions by their objective function values, the candidate bundle design solution having the lowest estimated objective function value representing an accepted fresh fuel bundle design for each of the N bundle groups and which satisfies the target conditions.

6. The method of claim 5, further comprising:
verifying that no improvement is possible for the accepted fresh fuel bundle design by:
performing a bundle simulation of bundles in the accepted design to generate actual bundle simulation outputs and a core simulation of a virtual core loaded in accordance with the accepted design that was run through the bundle simulation to generate actual core simulation outputs, and
determining an actual objective function value based on the actual bundle and core simulation outputs, wherein the accepted fuel bundle design for all N bundle groups exhibits no improvement if the actual objective function value equals or is within a given acceptable margin to the estimated objective function value.

7. The method of claim 6, further comprising:
setting the accepted fresh fuel bundle design as a modified reference fresh fuel bundle design, if the actual objective function value does not equal the estimated objective function value or is within the acceptable margin; and
repeating the generating of a response surface and iterating of the search algorithm to determine a modified acceptable fresh fuel bundle design.

8. The method of claim 7, further comprising;
iteratively repeating the setting, generating and iterating functions until an actual objective function value equals or is within a given acceptable margin to the estimated objective function value, or until no improvement in the actual objective function value is shown as between a current and previous iteration.

9. The method of claim 5, wherein the fuel rod types database stores a specified, standardized set of selectable fuel rod types for making the single fuel rod exchanges.

10. The method of claim 1, further comprising providing recommendations for modifying the accepted fresh fuel bundle design for display to a user.

11. A method of determining a fresh fuel bundle design for a core of a nuclear reactor, comprising:
employing at least one optimization routine to achieve a desired fuel bundle design meeting user-defined target conditions for up to N fresh fuel bundle groups of a given core being evaluated, the at least one optimization routine configured to:
generate a response surface based on making single fuel rod-type exchanges in each (i,j) fuel rod location of each bundle of a given reference bundle design being evaluated for each of the N bundle groups, the response surface including a plurality of transfer functions;
evaluate fuel rod type configurations of a plurality of candidate fresh fuel bundle design solutions, each candidate design solution generated by making multiple fuel rod-type exchanges made simultaneously across each of the N bundle groups using the generated response surface, with an objective function to converge to a desired fuel bundle design for each of the N bundle groups that satisfies the user-defined target conditions; and
outputting data related to the desired fuel bundle design that satisfies the user-defined target conditions for each of the N bundle groups for display to a user,
wherein generating the response surface includes perturbing a given reference bundle design for each of the N bundle groups by making a single fuel rod exchange at each (i,j) location of a given bundle in accordance with the given reference bundle design for each of the N bundle groups, wherein each of a plurality of fuel rod types stored in a fuel rod types database is selected to replace a given rod in each (i,j) location in a given bundle so as to generate a plurality of perturbed bundle designs for each of the N bundle groups, performing a bundle simulation of each of the bundles of the perturbed design to generate corresponding bundle simulation outputs, performing a core simulation of a virtual core loaded with the perturbed bundles of the perturbed design to generate core simulation outputs, and storing the bundle simulation outputs and core simulation outputs as data sets of the response surface, each data set of the response surface including a local response generated in accordance with a bundle simulation of a given perturbed bundle design due to the single fuel rod exchange and a global response generated in accordance with a core simulation of the perturbed bundle run through the bundle simulation.

12. The method of claim 11, wherein the objective function used to determine desired fuel bundle design is optimization routine-dependent; and the optimization routine is one of a random-based or deterministic-based optimization algorithm.

13. A core of a nuclear reactor having fresh fuel bundles loaded therein in accordance with the accepted fresh fuel bundle design determined by the method of claim 1.

* * * * *